March 22, 1960

J. W. CLARK 2,929,682

PROCESS FOR THE PRODUCTION OF HYDROGEN HALIDE
FROM A FRIEDEL-CRAFTS METAL HALIDE SLUDGE

Filed March 28, 1957

INVENTOR.
J. W. CLARK

BY Hudson and Young

ATTORNEYS

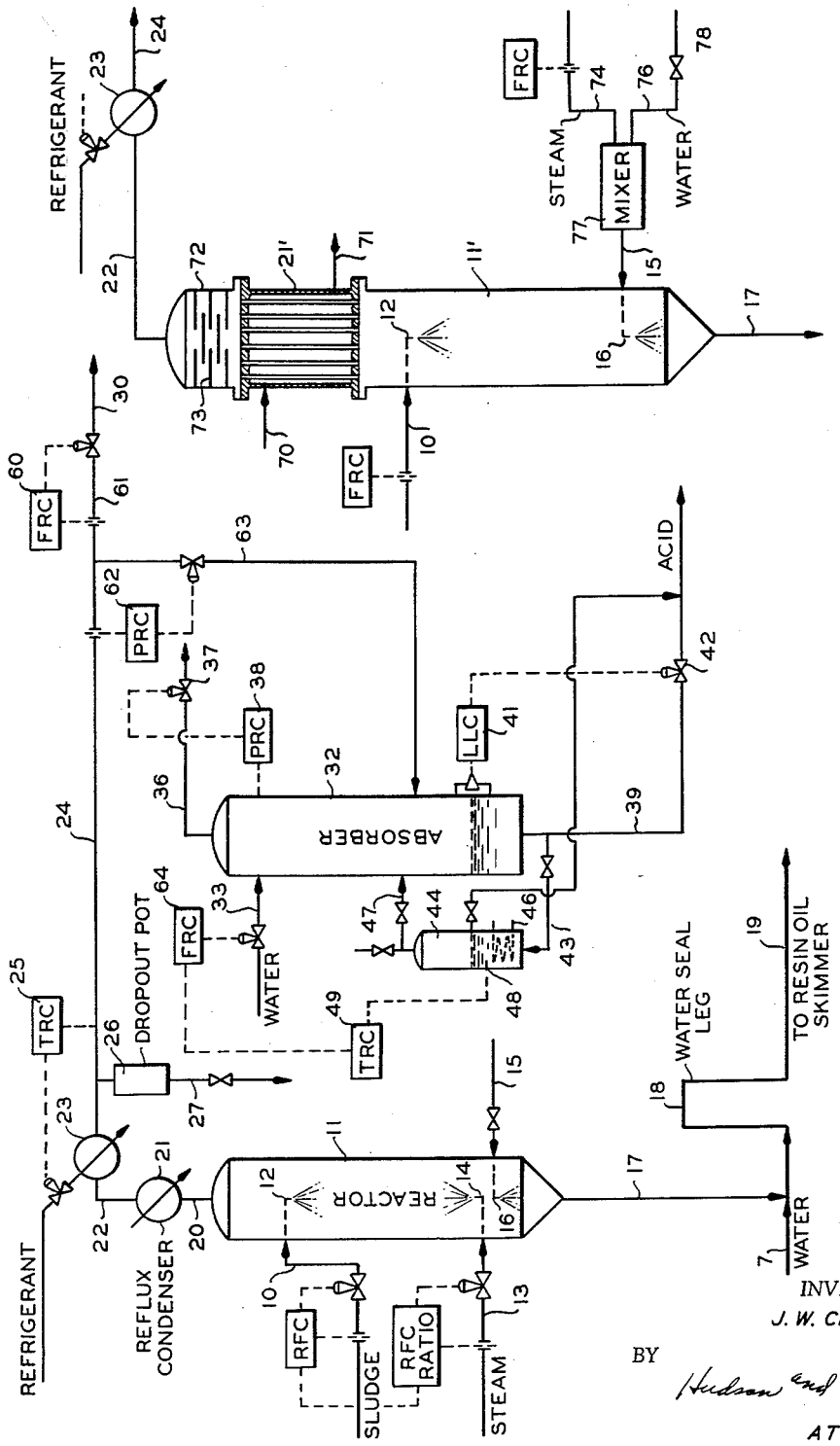

United States Patent Office 2,929,682
Patented Mar. 22, 1960

2,929,682

PROCESS FOR THE PRODUCTION OF HYDROGEN HALIDE FROM A FRIEDEL-CRAFTS METAL HALIDE SLUDGE

Joseph W. Clark, Phillips, Tex., assignor to Phillips Petroleum Company, a corporation of Delaware Application March 28, 1957, Serial No. 649,158

23 Claims. (Cl. 23—152)

This invention relates to the treatment of metal halide sludges to recover valuable components thereof. In one aspect, this invention relates to the production of hydrogen halides. In another aspect this invention relates to a method of operating a metal halide sludge hydrolysis unit whereby the amount of hydrogen halide produced overhead from said unit can be controlled.

Of great commercial interest at the present time are the isomerization and alkylation of low-boiling hydrocarbons, particularly members of the paraffin series such as the butanes, pentanes, and hexanes. The isomerization of methylcyclopentane to cyclohexane is also of commercial interest. In these reactions, a simple chemical change is effected under relatively mild conditions. In the case of isomerization, a change in carbon skeleton without change in number of carbon atoms occurs, and in the case of alkylation, the direct union of two molecules, such as an isoparaffin and an olefin, occurs to produce a higher molecular weight hydrocarbon. These reactions are known to be catalyzed to a greater or less extent by the so-called Friedel-Crafts metal halide catalysts, among the better known of which may be mentioned aluminum chloride, aluminum bromide, boron fluoride, zinc chloride, ferric chloride, antimony trifluoride, zirconium tetrachloride, and other polyvalent metal halides, generally used in anhydrous form. Of these catalysts, aluminum chloride has to date received the greatest commercial acceptance due to its activity, relatively low cost, and availability. Such metal halide catalysts are also utilized to a great extent in a relatively large number of other reactions involving hydrocarbons and other organic materials, and such uses are now well known in the art.

In most cases, the metal halide catalysts, as exemplified by aluminum chloride, are advantageously, and sometimes necessarily, activated with the corresponding anhydrous hydrogen halide or with other materials which provide the hydrogen halide under conditions of reaction. The quantity of hydrogen halide required varies greatly in accordance with the reaction being catalyzed and may range from less than one percent of the metal halide up to much larger quantities, such as 50 to 100 percent. The hydrogen halides, being normally gaseous or highly volatile liquids, frequently are lost from the reaction system by leaks or by incorporation in various effluent streams, as well as by reacting with components of the reaction mixture, and such losses in many cases represent a substantial proportion of the chemical cost in a commercial plant.

In organic reactions utilizing anhydrous aluminum chloride or the like, the aluminum chloride can be charged to the process either as a solid, or as a slurry formed by dissolving and/or suspending a considerable amount of aluminum chloride in hydrocarbons or other suitable liquids. In any case a liquid sludge is formed after a short period of operation, the rate usually being more rapid when the reactants are in liquid phase, and the sludge, which at the outset is active as a catalyst, gradually becomes deactivated with use. Such sludges may comprise complexes of aluminum chloride with hydrocarbons or other organic materials, as well as dissolved or suspended free aluminum chloride. In a process in which a sludge forming catalyst is utilized a portion of the sludge must be periodically or continuously withdrawn and replaced with fresh aluminum chloride in order to maintain an economic level of catalytic activity. The utilization of such sludge to avoid wasting its aluminum chloride content would be of appreciable economic advantage and would also simplify the problems of sludge disposal. However, in spite of the obvious need for recovering such aluminum chloride, it has heretofore been customary to discard the sludge as waste material. Although a number of processes have been proposed for utilizing partially spent catalyst to effect further reactions or to recover valuable components, various drawbacks have prevented such processes from being brought into commercially active use.

In copending application Serial No. 546,127, filed November 10, 1955, now Patent No. 2,852,582, of which I am one of the inventors, there is disclosed and claimed a process whereby the sludge formed in hydrocarbon conversion processes catalyzed by metal halide hydrocarbon complex catalysts, can be treated to recover valuable components thereof by first contacting said sludge in finely divided form in a first portion of a treating zone with a hydrolyzing agent, also in finely divided form, to effect only a partial hydrolysis of the metal halide contained in said sludge, and produce hydrogen halide and a finely-divided, free-flowing, solid residue. Said residue is then contacted in a second portion of said treating zone with water in an amount at least sufficient to substantially complete the hydrolysis of the metal halide in said residue. In said process, the hydrogen halide produced is removed overhead from said treating zone together with other vaporous products of the process.

Said hydrogen halide removed overhead from said treating zone is substantially anhydrous, i.e., it only contains from 0.1 to 2.0 percent water. It is desirable that said hydrogen halide be substantially anhydrous, particularly when it is to be used as a promoter for said metal halide catalyst in hydrocarbon conversion processes. At the same time, it is desirable in most instances to recover the maximum amount of hydrogen halide for the sludge being treated. The necessity for producing a substantially anhydrous hydrogen halide limits the amount of hydrogen halide which can be produced because when more water or steam is employed to increase the amount of hydrolysis occurring in the first section of said treating zone, said increased amount of water goes overhead and a wet hydrogen halide is produced which must then be dried.

I have now found that by passing the vaporous overhead stream comprising unreacted steam or water vapor and vaporous products of the hydrolysis reactions from said treating zone through a condensing zone and returning condensed steam or water vapor containing dissolved hydrogen halide directly to said treating zone that the efficiency of the process is markedly increased. Said increase in efficiency is accomplished without sacrifice in the substantially dry properties of the hydrogen halides. Indeed, when operating according to my invention, a drier hydrogen halide is obtained than has heretofore been possible as is explained hereinafter.

I have also found that the amount of hydrogen halide which is produced overhead in the above described process can be controlled by controlling the amount of water introduced into the second portion of said treating zone.

An object of this invention is to recover valuable components from metal halide sludges. Another object of this invention is to provide an improved method of recovering hydrogen halide in a process wherein metal halide sludges, formed in hydrocarbon conversion processes catalyzed by metal halide catalysts, are treated to recover valuable components of said sludges. Another object of the invention is to treat liquid sludges comprising Friedel-Crafts metal halides in free and/or combined form in a simple but effective manner in order to recover the halogen content thereof. Another object of the invention is to provide a method of controlling the amount of hydrogen halide produced as an overhead stream in a process wherein a metal halide sludge is treated with a hydrolyzing agent to recover valuable components thereof. Still another object of this invention is to provide a method of producing a hydrogen halide aqueous solution of substantially constant predetermined concentration from the hydrogen halide produce overhead in a process wherein a metal halide sludge is hydrolyzed. Still another object of this invention is to provide a method for disposing of metal halide sludges formed in hydrocarbon conversion processes catalyzed by metal halide catalysts. Other aspects, objects, and advantages of the invention will be apparent to those skilled in the art in view of this disclosure.

Thus according to the invention there is provided a process for treating a Friedel-Crafts metal halide sludge formed during the catalytic conversion of hydrocarbons in the presence of a Friedel-Crafts metal halide catalyst which comprises: contacting said sludge in finely divided form with a hydrolyzing agent, also in finely divided form, in an upper portion of a treating zone and effecting a partial hydrolysis of the metal halide contained in said sludge; withdrawing unreacted hydrolyzing agent and vaporous products of said hydrolysis reaction as an overhead effluent from said treating zone; passing said effluent through a condensing zone; returning condensed hydrolyzing agent from said condensing zone directly to the upper portion of said treating zone at a point above the point of introduction of said sludge; and recovering substantially anhydrous hydrogen halide from said effluent after its passage through said condensing zone, said hydrolyzing agent being selected from the group consisting of finely divided water and steam.

Further according to the invention there is provided in a process for the production of hydrogen halide from a Friedel-Crafts metal halide sludge, formed during an organic reaction in the presence of a Friedel-Crafts metal halide catalyst, wherein said sludge is contacted in a first section of a treating zone with a hydrolyzing agent to produce vaporous hydrogen halide as an overhead product and a residue, and said residue is then contacted with water in a second section of said treating zone, the method of operation which comprises: withdrawing said vaporous hydrogen halide overhead from said treating zone; contacting at least a portion of said vaporous hydrogen halide from said treating zone with water in an absorption zone to form an acid; determining the boiling point of said acid; and controlling at least one of (a) the amount of water introduced into said second section of said treating zone, and (b) the amount of water introduced into said absorption zone, responsive to the boiling point of said acid.

It is to be noted that only a partial hydrolysis of the metal halide contained in the sludge and/or catalyst is effected in the first stage of the process. In the practice of the invention, it is generally preferred to carry out the first stage hydrolysis under conditions so as to effect a degree of hydrolysis within the range of about 50 to about 70 percent of the metal halide content of said sludge. However, with some sludges, a higher amount of hydrolysis can be effected. It is important that the residue obtained from the first stage hydrolysis step be a residue which can be easily handled in the second stage of the process, i.e., when said residue is contacted with liquid water in order to complete the hydrolysis. It has been found that effecting hydrolysis of from about 50 to about 70 percent of the metal halide contained in the sludge in the first stage of the process produces a finely-divided, free-flowing, solid residue which can be easily and readily handled in the second stage of the process.

As mentioned above, a drier hydrogen halide can be obtained when operating according to my invention and passing the vaporous overhead stream from the treating zone through a condensing zone. I have found that the hydrogen halide effluent stream from said condensing zone usually contains only about 0.05 weight percent water. Said water content will vary depending upon temperature, from 0.01 to 0.1 weight percent. When the effluent from said condensing zone is passed through a refrigerated second condensing zone so as to remove hydrocarbons therefrom, I have found that the effluent from said second condensing zone contains only about 15 to 40 parts per million of water depending upon temperature. Thus, an essentially anhydrous hydrogen halide stream is obtained.

An important advantage of my method of controlling the amount of hydrogen halide produced overhead from the treating zone is that the flexibility of the process is markedly increased. In many plants wherein the metal halide catalysts are employed for the conversion of hydrocarbons, there is produced a great excess of the metal halide sludge. In many instances, this excess sludge is more than enough to supply the necessary amount of hydrogen halide for promoting the hydrocarbon conversion reaction. In some instances, it may be desirable to recover only sufficient hydrogen halide for use in promoting the hydrocarbon conversion reaction. In other instances, it may be desirable to recover the maximum amount of hydrogen halide which can be recovered from the sludge. Thus my method of controlling the amount of hydrogen halide produced overhead from the treating zone makes it possible to operate the sludge hydrolysis treating unit to produce only the amount of hydrogen halide necessary for use as a promoter, or to produce and recover a maximum amount of hydrogen halide with said excess being sold as a dilute solution of said hydrogen halide, such as muriatic acid.

The process of my invention is applicable for the treatment of any metal halide sludge obtained from a conversion process wherein hydrocarbons are converted in the presence of a metal halide catalyst. Among such processes which are of particular importance today are the various alkylation and isomerization processes employing aluminum chloride as a catalyst. Due to the importance of said alkylation and isomerization processes, and for the sake of convenience, the invention will be further described as applied to said processes.

In a typical isomerization process a dry normal butane is contacted at suitable temperatures and pressures with an aluminum chloride catalyst along with hydrogen chloride. As the isomerization reaction proceeds, a liquid aluminum chloride sludge is formed which contains considerable aluminum chloride. Ordinarily this sludge is withdrawn from the reaction chamber and discarded. In the practice of the present invention this sludge is withdrawn from the reaction chamber and passed to a hydrolysis zone wherein a two stage hydrolysis is effected and valuable components of said sludge, including hydrogen chloride, are recovered. The recovered hydrogen chloride is recycled to the reaction chamber.

In a typical alkylation process, a stream of ethylene together with isobutane in a mol ratio of approximately 4.5 mols of isobutane to 1 mol of ethylene is charged into an alkylator along with a small amount of hydrogen chloride. In said alkylator, said hydrocarbons are intimately contacted with an aluminum chloride-hydrocarbon complex catalyst which is usually introduced into the alkylator as a stream separate from the feed stream. The alkylation reaction is carried out at a pressure sufficiently high to maintain said hydrocarbons in liquid phase, for example, at about 375 to 450 pounds per square inch gauge. A temperature of about 80 to about 150° F. is employed. The viscosity of the catalyst is usually maintained at about 200 to 350 centipoises at 100° F. Said catalyst can be previously prepared by mixing aluminum chloride and kerosene in a weight ratio of about 8:5. During operation, the original complex catalyst is replaced with complex catalyst formed in the process and which contains aluminum chloride and hydrocarbons in a weight ratio of about 1:1. The viscosity of the catalyst and also the conversion of ethylene depends upon catalyst activity which can be maintained by adding make-up aluminum chloride to a recycle stream of catalyst. With an active catalyst, conversion of ethylene can be maintained within the desired range of 90 to 99 percent, preferably 97 to 99 percent. A catalyst ratio of about 1 vol. of catalyst per 1.5 to 2 volumes of hydrocarbons is usually employed.

Reaction mixture comprising unreacted hydrocarbons, alkylate and catalyst phase is withdrawn from the reactor and passed into a settler wherein a separation is effected between the hydrocarbon phase and the catalyst. Said hydrocarbon phase is removed and product separated therefrom in any conventional manner.

The bottom layer in said settler comprises the aluminum chloride-hydrocarbon complex catalyst which contains the sludge which has formed during the conversion reaction. In operation said bottom layer is withdrawn and the greater portion thereof is recycled to the alkylator. As mentioned, during the reaction the volume of the catalyst phase increases due to the formation of sludge. Therefore, it is necessary to withdraw a portion of said catalyst phase intermittently or continuously, preferably continuously, so as to maintain the volume of the catalyst phase substantially constant. In the practice of my invention, said withdrawn portion of the catalyst phase is passed to a hydrolysis zone and the metal halide contained therein is hydrolyzed as described further hereinafter. The hydrogen chloride produced in the hydrolysis zone is returned to the alkylation zone.

Herein and in the claims, unless otherwise specified, the word "sludge" is employed generically and includes, liquid metal halide-hydrocarbon complex catalyst containing sludge therein such as that employed in alkylation processes, and liquid sludge per se such as that which forms when a solid metal halide catalyst is employed as in some isomerization processes.

Figure 2 is a diagrammatic flow sheet illustrating another embodiment of the invention wherein an aqueous solution of hydrogen halide of substantially constant concentration is produced from the hydrogen halide removed overhead from the hydrolysis zone.

Figure 3 illustrates a modification of the hydrolysis tower of Figures 1 and 2.

Referring now to the drawings, wherein like reference numerals are employed to denote like elements, the invention will be more fully explained.

Figure 1:
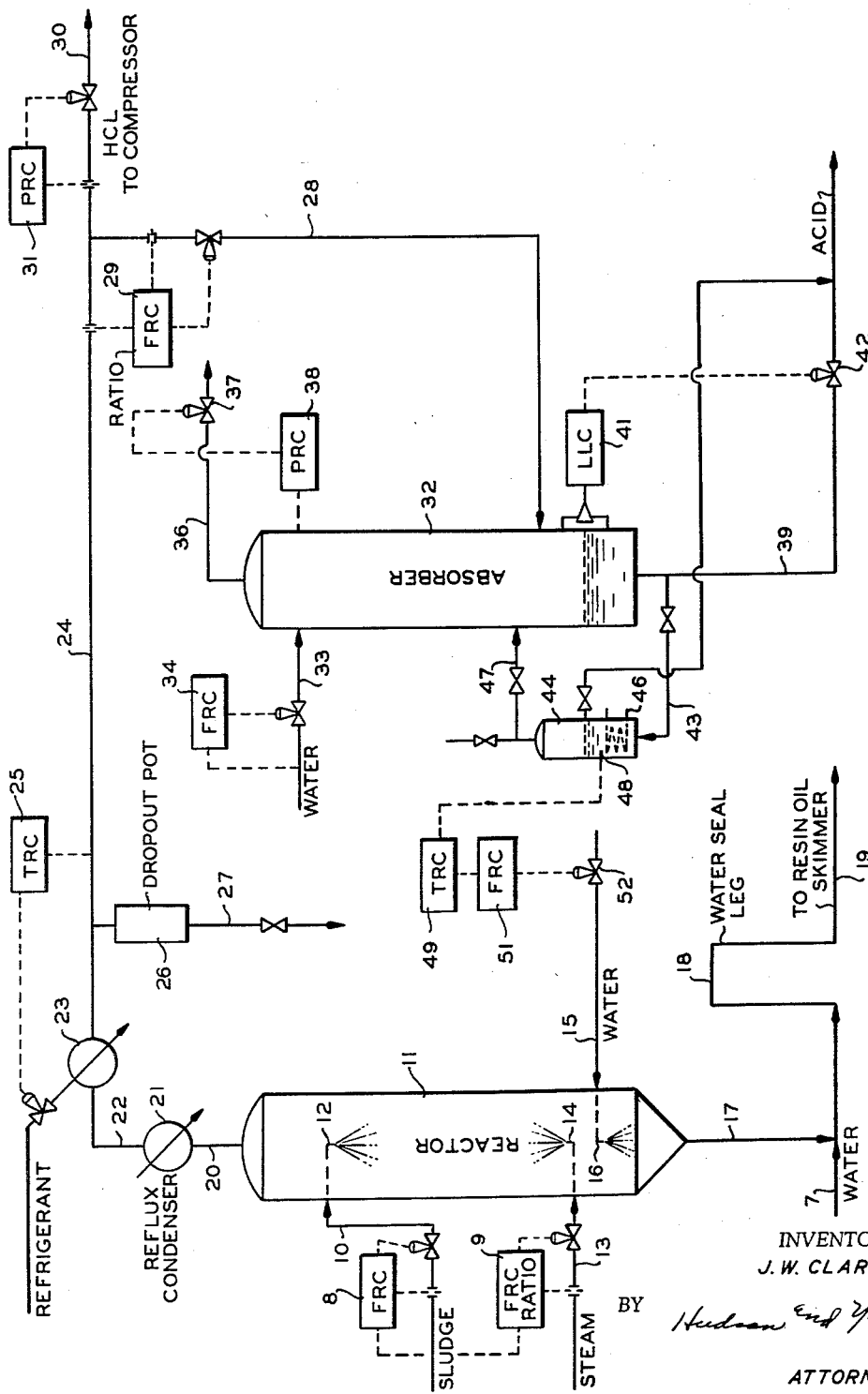
Figure 1 is a digrammatic flow sheet illustrating a presently preferred embodiment of the invention wherein a controlled constant quantity of hydrogen halide is produced overhead from the hydrolysis zone.

In Figure 1, a stream of aluminum chloride sludge, from a hydrocarbon conversion process wherein an aluminum chloride catalyst is used, is introduced via conduit 10 into hydrolysis tower 11 wherein it is sprayed in finely-divided liquid condition, preferably downwardly, by means of spray nozzle means 12. Said spray nozzle means is positioned intermediate the ends of tower 11, usually in an upper portion. Said spray nozzle means should preferably have an angle of spray, such that the particles of finely divided sludge do not impinge the wall of hydrolysis tower 11 before partial hydrolysis occurs so as to prevent the liquid sludge from adhering to said wall. The amount of sludge introduced via conduit 10 can be controlled by flow recorder controller 8. Water or steam is introduced via conduit 13 into hydrolysis tower 11 wherein it is sprayed, preferably upwardly, in finely-divided form by means of spray nozzle 14. Said spray nozzle means 14 is positioned below said spray nozzle means 12 and preferably has an angle of spray, such that the steam or the particles of finely divided water substantially completely blankets the cross sectional area and preferably impinge the wall of hydrolysis tower 11. The amount of steam or water introduced via conduit 13 can be controlled by flow recorder ratio controller 9 whch is reset responsive to a signal from FRC8 so as to maintain a predetermined ratio between the flow in conduits 10 and 13. Finely divided sludge from spray nozzle means 12 is thus sprayed downwardly into the steam or the particles of finely divided water introduced through spray nozzle means 14. Said sludge reacts with said water or steam and liberates substantial quantities of heat. When water is used, the heat thus released causes a considerable portion of the water to vaporize and form steam, which rises through tower 11 and thus contacts the downwardly sprayed particles of finely divided sludge. By properly controlling the sludge to water ratio, as discussed further hereinafter, particles of a finely-divided, partially hydrolyzed, solid residue are obtained.

Said particles of partially hydrolyzed residue fall downwardly through hydrolysis tower 11 and into a second spray of finely divided water introduced via conduit 15 and spray nozzle means 16. Said spray nozzle means 16 preferably has an angle of spray such that the particles of finely divided water impinge the wall of said tower 11, thus substantially blanketing the cross sectional area of said tower. Further hydrolysis of aluminum chloride contained therein takes place when said particles of partially hydrolyzed residue fall into the spray of finely divided water, and when the water is carrying said particles of residue down the sloping wall of the cone shaped bottom of tower 11. This second stage hydrolysis reaction produces more hydrogen chloride and releases the hydrocarbons and/or resin oils which were retained in the particles of partially hydrolyzed residue from the first stage hydrolysis. There is also released or there remains a second finely-divided, solid residue comprising the oxides of the metal originally present in the aluminum chloride catalyst. Said released oils, and water containing dissolved hydrogen chloride, as well as dissolved and/or suspended finely-divided oxide residue, flow via conduit 17 into water seal leg 18 and thence via conduit 19 into conventional separation apparatus for the separation of the resin oils, dilute hydrogen chloride solution and inorganic oxide residue. If desired additional water can be introduced through conduit 7 to aid in transporting the materials from conduit 17 through water seal leg 18.

Vaporous products of the hydrolysis reactions are withdrawn overhead from tower 11 via conduit 20. Said vaporous products which comprise hydrogen chloride, light hydrocarbons, and water are passed through reflux condenser 21 which in most instances is a water cooled condenser. Substantially all the water contained in said product stream is condensed in said condenser 21 and returned directly to the upper portion of tower 11, preferably at a point above the point of introduction of the sludge. Said returned stream of water, which contains dissolved hydrogen chloride, upon entering tower 11 is revaporized and again enters condenser 20, thus an equilibrium is established between the upper portion of tower 11 and condenser 20. Higher boiling hydrocarbons, e.g., from about $C_5$ to about $C_{10}$, are condensed in condenser 21, returned to the tower and are removed from the bottom of tower 11 via conduit 17 with the remainder of the resin oils. A stream comprising substantially anhydrous hydrogen chloride and light hydrocarbons ($C_1$ to C₅) is removed from condenser 21 via conduit 22 and passed through refrigerated condenser 23. Said refrigerated condenser 23 can be cooled with any conventional refrigerant, such as propane, ammonia, sulfur dioxide, and the like. The temperature maintained within condenser 23 can be controlled responsive to the temperature in conduit 24 by means of temperature recorder controller 25. Effluent from condenser 23 is passed into conduit 24 and condensed light hydrocarbons therein together with small traces of water are collected in drop-out pot 26 from which condensate can be removed via conduit 27 for disposal as desired. A predetermined proportion of said effluent in conduit 24 is diverted into conduit 28 by means of ratio flow recorder controller 29 as will be understood by those skilled in the art and the remainder of said effluent, now essentially anhydrous hydrogen chloride, is passed via conduit 30 to compressor means (not shown) for return to said hydrocarbon conversion process or other desired use. Pressure recorder controller 31 maintains a constant back pressure on the system.

The predetermined proportion of hydrogen halide, diverted in conduit 28, is introduced into absorber 32 wherein it is contacted countercurrently with a stream of water introduced via conduit 33 into the upper portion of said absorber 32. The amount of water introduced via conduit 33 can be maintained constant by means of flow recorder controller 34. Any unabsorbed gases are removed from absorber 32 via conduit 36 having back pressure valve 37 therein. Pressure recorder controller 38, operatively connected to said valve 37, maintains a predetermined pressure within absorber 32. Aqueous hydrogen chloride is withdrawn from the bottom of absorber 32 via conduit 39 responsive to liquid level controller 41 which is operatively connected to valve 42. A small amount of said aqueous hydrogen chloride is withdrawn from conduit 39 and passed via conduit 43 into boiler analyzer 44 equipped with heating means 46. In said boiler analyzer said aqueous hydrogen chloride is boiled and vapors therefrom are returned via conduit 47 into absorber 32. Pressure recorder controlled 38 on said absorber 32 also serves to maintain a substantially constant pressure in said boiler analyzer 44. Temperature sensing means 48 extends into the boiling liquid in said boiler analyzer and is operatively connected to flow recorder controller 51. The signal generated by temperature sensing means 48 actuates temperature recorder controller 49 which inturn actuates flow recorder 51 and control valve 52, which controls the amount of water introduced via conduit 15 into hydrolysis tower 11.

In Figure 2, the operations carried out in hydrolysis tower 11 are the same as those described in connection with Figure 1. However in this embodiment of the invention, it is desired to produce a stream of muriatic acid having a substantially constant concentration. In the practice of this embodiment of the invention, a predetermined quantity of the effluent in conduit 24 controlled by flow recorder controller 60 is passed via conduit 61 to the compressor or other use of Figure 1. The remainder of said effluent in conduit 24 is passed, responsive to pressure recorder controller 62, into conduit 63 and then introduced into the lower portion of absorber 32 as previously described in connection with Figure 1. Said effluent is contacted countercurrently with a stream of water introduced through conduit 33 as in the embodiment described in Figure 1 and a stream of muriatic acid is withdrawn through conduit 39. A portion of the withdrawn acid in conduit 39 is passed into boiler analyzer 44 wherein it is boiled as previously described. In this embodiment of the invention the signal from temperature sensing means 48 actuates temperature recorder controller 49 which in turn actuates or resets flow controller 64 so as to vary the amount of water introduced into absorber 32 via conduit 33 and thus maintain the concentration of the acid withdrawn through conduit 39 substantially constant.

In Figure 3 there is shown a modification of hydrolysis tower 11 which is designated 11': In this modification reflux condenser 21' is mounted as a shell and tube heat exchanger section directly on top of tower 11': Coolant, usually water, is introduced on the shell side via conduit 70 and withdrawn via conduit 71. A mist extractor 72 is mounted by means of the flanges shown, or other suitable means, on top of condenser 21': Baffles 73 in said mist extractor serve to remove any condensed liquid which may be entrained in the vapors leaving condenser 21'.

In the operation of the apparatus shown in Figure 3 sludge is introduced via conduit 10 and sprayed downwardly in finely divided liquid form by spray nozzle means 12 as in Figure 1. Steam from conduit 74 and water from conduit 76 are mixed in mixer 77 and introduced via conduit 15 and spray nozzle means 16 into tower 11': The steam in said mixture rises upwardly through tower 11' and contacts descending particles of sludge causing partial hydrolysis of the metal halide therein in the first stage of the process. Finely divided particles of partially hydrolyzed sludge then fall into the downwardly directed spray of water from nozzle 16 and hydrolysis of the metal halide therein is substantially completed in the second stage of the process. Vaporous products of the hydrolysis reactions pass through condenser 21' wherein water and higher boiling hydrocarbons are condensed and returned to the tower as described in connection with Figure 1. A stream comprising substantially anhydrous hydrogen chloride is removed via conduit 22 and treated as described in connection with Figure 1. Other products of the hydrolysis reactions are withdrawn from tower 11' via conduit 17 as in Figure 1.

Valve 78 in conduit 76 can be a motor valve like valve 52 in Figure 1 and can be controlled as described in connection with Figure 1.

Hydrolysis towers 11 and 11' and condensers 21, 21', 23 and 23' should be constructed of corrosion resistant materials because of the corrosive nature of the sludge being treated and the corrosive nature of the hydrogen halide in the presence of water. Special linings of glass, ceramic, or plastic, all available, commercially, can be employed. Karbate, a commercially available material, is a suitable construction material.

In Figures 1, 2, and 3 the various spray nozzle means have been illustrated as comprising a single spray nozzle. It should be understood that said spray nozzle means can comprise a plurality of spray nozzles when necessary or desired.

Thermocouple wells (not shown) can be provided for determining temperatures within the tower at various points.

It is, of course, well known that aluminum chloride can be hydrolyzed with water to form hydrogen chloride and aluminum oxide. The exact nature of the physical changes, as opposed to the said chemical changes, which occur in the sludge being treated according to the invention is presently unknown. When aluminum chloride sludges are mixed with water, there is formed a heavy, tarry residue which fouls lines, pumps, and other equipment, and in some instances, even sets to a solid in such equipment. In some instances when such sludges are contacted with water, excessive foaming takes place with the formation of an emulsion which is very difficult to break.

Steam is usually used as the hydrolyzing agent in the first stage of the process when said process is carried out at low pressures, i.e., atmospheric pressure or substantially atmospheric pressures in the range of 0 to 50 p.s.i.g. Water is usually used at higher pressures. The amount of water or steam used in the first stage of the process is an amount sufficient to effect only a partial hydrolysis, e.g., from about 50 to about 70 weight percent, of the metal halide contained in the sludge. The minimum amount of water used in the second stage of the process is the amount necessary to substantially complete the hydrolysis of said metal halide.

The amount of water or steam injected into the first stage of the process must be carefully controlled so as to obtain a free-flowing, finely-divided residue which falls downwardly through the tower and is contacted with water in the second stage of the process. The amount of water or steam injected into the first stage of the process (as through nozzle 14 in Figure 1) preferably ranges from about 0.05 to about 0.25 pound of water per pound of sludge. Stated another way, the sludge to water ratio in the first stage of the process is in the range of 4 to 20 pounds of sludge per pound of water. If the sludge to water (or steam) ratio is too high insufficient hydrolysis will result and the bottom product will be viscous.

The amount of water used in the second stage of the process can range from 0.25 to 1 pound of water per pound of sludge. Stated another way, the sludge to water ratio in the second stage can range from about 1 to 4 pounds of sludge per pound of water. Some of the water introduced into the second stage will be vaporized and rise through the tower to contact the sludge in the first stage zone of the tower. This factor should be taken into consideration when setting the amount of water or steam to be injected into the first stage of the process. It is preferred to so adjust the amounts of water or steam injected into the first stage and the amount of water injected into the second stage that the overall sludge to water ratio will be in the range of 1 to 3 pounds of sludge per pound of water, preferably in the range of 1.2 to 2.4 pounds of sludge per pound of water.

The process of the invention can be operated without the introduction of external steam, per se. However, this is not a preferred method of operation because the operation is not as uniform as when external steam is employed. The term "external steam" is employed to designate steam introduced from without the hydrolysis tower as opposed to steam generated within the tower. Employ of the term external steam affords another basis for expressing the operable limits on the amounts of sludge and water introduced into the tower. Thus the external steam to water weight ratio can vary from 0 to about 1.25. However, as stated above it is definitely preferable to use external steam. Therefore the preferred external steam to water weight ratio is within the range of 0.3 to 0.6. The overall sludge to water ratio is as stated above.

The temperature at which the sludge is introduced into hydrolysis tower 11 will depend upon the nature of the sludge being treated, the spraying characteristics of said sludge, and the type of spraying equipment employed. It is preferred to heat the sludge to a temperature within the range of about 225 to about 400° F. When steam is employed as the hydrolyzing medium it is usually introduced at a temperature within the range of 225 to 325° F. When water is employed as the hydrolyzing medium it is introduced as a finely divided mist or fog employing any of the several well known fog nozzles which are available commercially. It is not necessary to preheat the water.

Pressure is not a limitation upon the process of the invention. The process can be carried out at atmospheric or substantially atmospheric pressures i.e., pressures within the range 0 to 50 p.s.i.g. The process can also be carried out at reasonably higher pressures such as up to about 600 p.s.i.g. by employing suitable pressure equipment. At the higher pressures the corrosive nature of the sludges being treated and of the products obtained therefrom cause complications in the selection of suitable construction materials for the apparatus.

EXAMPLE I

A spent aluminum chloride sludge from the alkylation of isobutane with ethylene, as described above, containing approximately 54 percent by weight of aluminum chloride complexed with approximately 46 percent by weight of hydrocarbons was heated to a temperature of 250° F. and sprayed downwardly at a rate of 93 pounds per hour into a tower like hydrolysis tower 11 in Figures 1 and 2. Sludge spray nozzle 12 had an orifice diameter of 15 microns and was purchased from the Bete Fog Nozzle Company of Greenfield, Mass.

Steam for the first stage of the process (partial hydrolysis) was introduced through spray nozzle 14 at a rate of 16.4 pounds per hour. Water for the second stage of the process was introduced through spray nozzle 16 at a rate of 30.6 pounds per hour. Vaporous products of the hydrolysis reactions were removed overhead from said tower via conduit 20. Bottoms product comprising water (dilute muriatic acid), organic residue, resin oil, and inorganic residue (finely divided oxide), was removed via conduit 17.

Table I given below summarizes operating conditions and yields obtained in the above operation.

Table I

| | |
|---|---|
| Sludge rate, lbs./hr. | 93 |
| Sludge spray pressure, p.s.i.g. | 70 |
| Sludge preheat temperature, °F. | 250 |
| Steam rate, lbs./hr. | 16.4 |
| Sludge/steam wt. ratio | 5.7 |
| Water rate, lbs./hr. | 30.6 |
| Sludge/water wt. ratio | 3.04 |
| Sludge/total water wt. ratio | 1.98 |
| External steam/water wt. ratio | 0.535 |
| | |
| Sludge composition, wt. percent: | |
| Hydrocarbons | 7.2 |
| Aluminum chloride | 54.0 |
| Resin oil | 38.8 |
| | 100.0 |
| | |
| HCl produced (overhead), lbs./hr. | 35.8 |
| HCl available (theoretical), lbs./hr. | 41.2 |
| HCl recovered, percent of theoretical | 86.8 |
| HCl yield, lbs./lb. sludge | 0.38 |

Table II given below is a material balance for the above described operation.

Table II

MATERIAL BALANCE

| | |
|---|---|
| Feed streams: | |
| Sludge feed rate, lb./hr. | 93.0 |
| Steam rate, lb./hr. | 16.4 |
| Water rate, lb./hr. | 30.6 |
| Total | 140.0 |
| | |
| Overhead vapor from water cooled condenser: | |
| HCl, lb./hr. | 35.8 |
| Gases ($C_1$–$C_5$), lb./hr. | 6.7 |
| Water, lb./hr. | 0.02 |
| Total | 42.52 |
| | |
| Overhead vapor from propane cooled condenser: | |
| HCl, lb./hr. | 35.8 |
| $CO_2$, lb./hr. | 0.9 |
| Propane, lb./hr. | 1.0 |
| Water, p.p.m. | 15.0 |
| Total | 37.7 |
| | |
| Bottom product: | |
| Water rate, lb./hr. | 36.6 |
| Aluminum oxide,[1] lb./hr. | 19.2 |
| HCl, lb./hr. | 5.4 |
| Resin oil, lb./hr. | 36.3 |
| Total | 97.5 |

[1] Does not include any water of hydration.

EXAMPLE II

With the hydrolysis tower operating as described in Example I, it is desired to pass 20 pounds per hour of hydrogen chloride via conduit 30 in Figure 1 to a hydrogen chloride compressor and to dispose of the remainder of the hydrogen chloride from the bottom of the hydrolysis tower through conduit 17. Ratio controller 29 is set to pass 90 percent of the effluent in conduit 24 into conduit 30 and to divert 10 percent of said effluent into conduit 28. Under the operating conditions as described in Example I, these flow streams will then be, on the basis of hydrogen chloride:

Total flow, lb./hr., 35.8
To compressor, lb./hr.=35.8 (0.9)=32.22
To analyzer, lb./hr.=35.8 (0.1)=3.58

Since it is desired to pass a constant quantity of hydrogen chloride to the compressor via conduit 30 and thus in effect produce a constant quantity of hydrogen chloride overhead from hydrolyzer 11, the water introduced via line 33 into absorber 32 is maintained constant and set at a rate of 25 pounds per hour. Under these conditions, the hydrogen chloride removed from said absorber through conduit 39 will contain 12.5 percent by weight hydrogen chloride.

Figure 4:
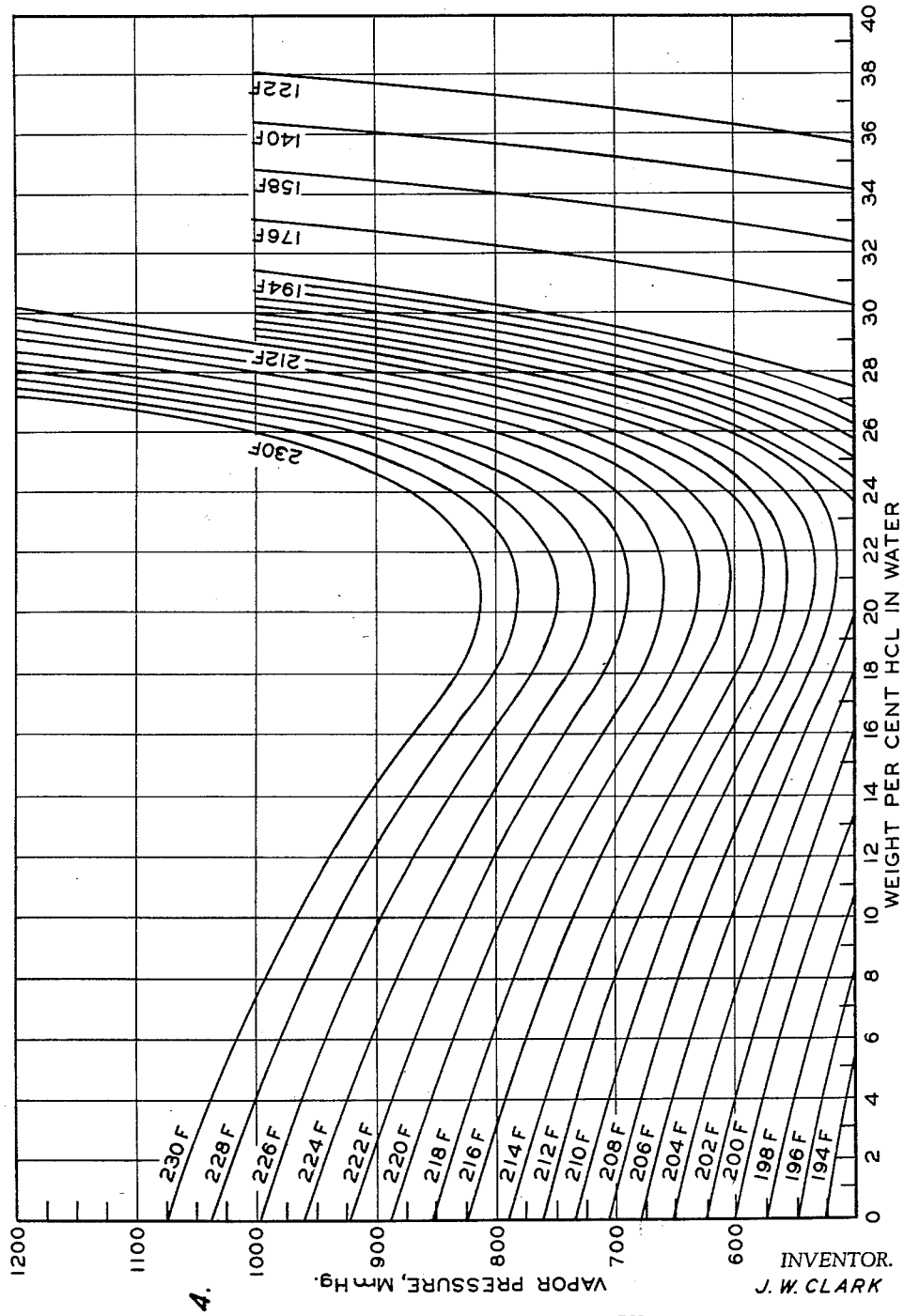
Figure 4 is a graph illustrating variations of the boiling point of hydrogen chloride solution of different concentrations.

However, it is desired to pass only 20 pounds of hydrogen chloride via conduit 30 to the compressor. Said 20 pounds per hour will be 90 percent of the overhead stream from tower 32 and the remainder of said stream will amount to 2.22 pounds per hour. Thus the concentration of the hydrogen chloride solution withdrawn from absorber 32 through conduit 39 at the desired conditions is 2.22/27.22=8.16 weight percent. With absorber 32 and boiler analyzer 44 operating at 800 millimeters mercury pressure absolute, the boiling point of 12.5 percent hydrogen chloride is 222.2° F. (Figure 4). The boiling point of 8.16 weight percent hydrogen chloride is 218.9° F. (Figure 4). Thus setting temperature recorder controller 49 at 218.9° F. causes valve 52 to open and admit more water via conduit 15 into hydrolyzer 11 so as to absorb more hydrogen chloride and remove same from hydrolyzer 11 via conduit 17 instead of producing it overhead. Thus upon an increase in boiling point of the hydrogen chloride solution above 218.9° F. TRC 49 opens valve 52 to admit more water and a decrease in said boiling point causes valve 52 to decrease the amount of water added to tower 11.

EXAMPLE III

With hydrolyzer 11 operating as described in Example I, it is desired to send 20 pounds per hour of overhead product from conduit 24 into conduit 30 and to make a muriatic acid product containing 12 weight percent hydrogen chloride from the remainder of said overhead product in line 24. At 800 millimeters of mercury pressure, the boiling point of 12 weight percent muriatic acid is 222° F. (Figure 4). Thus setting temperature recorder controller 49 at 220° F. will reset flow recorder controller 64 (Figure 2) to admit 146.4 pounds per hour of water into absorber 32 and thus produce said 12 weight percent muriatic acid. If for some reason, such as an increase in the aluminum chloride content of the sludge introduced into hydrolyzer 11, the amount of hydrogen chloride introduced into absorber 32 is increased to 25 pounds per hour, the concentration of the acid withdrawn from said absorber will be increased to 14.57 weight percent and the boiling point thereof will increase to 224.1° F. (Figure 4). When this occurs, temperature recorder controller 49 will again reset flow recorder 64 to increase the amount of water to absorber 32 to 183.3 pounds per hour and thus restore the concentration of the acid withdrawn through conduit 39 to 12 weight percent.

Referring to Figure 4, it will be noted that the boiling point curve of hydrogen chloride aqueous solutions goes through a minimum at about 20–21 weight percent hydrogen chloride. Thus when the boiler analyzer is employed the control method of the invention cannot be advantageously employed in concentration ranges ranging from 19 to 23 weight percent. The control method of the invention can be employed with the boiler analyzer in the range from 0.1 to 19 weight percent inclusive and in the range from 23 to 38 weight percent inclusive. It is believed obvious that the control instruments must be reversed in going from concentrations within the range of 0.1 to 19 weight percent to concentrations within the range of 23 to 38 weight percent because in said first range, the boiling point of the solution is decreasing with increasing concentration and in the second range said boiling point is increasing with increasing concentrations.

Examples II and III show that the amount of hydrogen chloride produced and recovered overhead from hydrolysis tower 11 can be effectively controlled by controlling the amount of water introduced into the bottom of said tower 11.

The curves shown in Figure 4 were constructed from data given in Perry, "Chemical Engineers Handbook," 3rd ed., pp. 166–7 (1950).

While the invention has been described as employing a boiler analyzer for determining the concentration of the acid solution withdrawn from absorber 32 via line 39, any other suitable method for determining the concentration of said acid solution can be employed. For example, referring to Figure 1, instead of employing boiler analyzer 32, a gravitometer or a refractometer can be employed. In such instances a sample of the acid solution in line 39 would be passed via line 43 into said gravitometer, or said refractometer, and the specific gravity or refractive index of the solution determined. A signal generated by a suitable control instrument responsive to said specific gravity or said refractive index determination can then be employed to actuate FRC 51 or FRC 64 as the case may be. It will be realized by those skilled in the art that charts similar to Figure 4 for utilization in connection with said refractometer or said gravitometer can be prepared.

When a gravitometer or refractometer is employed the control method of the invention can be employed to determine hydrogen chloride solution concentrations within the range of 0.1 to 38 weight percent inclusive.

It will be realized by those skilled in the art that the solubility of hydrogen chloride and other hydrogen halides in water varies with temperature and pressure conditions. Thus the above ranges of concentrations are expressed as practical preferred operating ranges. Solutions containing more than 38 weight percent can be prepared by proper choice of temperature and/or pressure conditions.

As will be evident to those skilled in the art, in view of the above disclosure, various other modifications of the invention can be made without departing from the spirit or scope of said invention.

I claim:
1. A continuous process for treating a Friedel-Crafts metal halide sludge formed during the catalytic conversion of hydrocarbons in the presence of a Friedel-Crafts metal halide catalyst which comprises: contacting said sludge in finely divided liquid form with a hydrolyzing agent, also in finely divided form, in an upper portion of a treating zone and effecting a partial hydrolysis of the metal halide contained in said sludge; withdrawing unreacted hydrolyzing agent and vaporous products of said hydrolysis reaction as an overhead effluent from said treating zone; passing said effluent through a condensing zone; returning condensed hydrolyzing agent from said condensing zone as reflux directly to the upper portion of said treating zone at a point separate from and above the point of introduction of said sludge; and recovering substantially anhydrous hydrogen halide from said effluent after its passage through said condensing zone, said hy- drolyzing agent being selected from the group consisting of finely divided water and steam.

2. The process of claim 1 wherein said metal halide is aluminum chloride and said hydrolyzing agent is steam.

3. A continuous process for treating a Friedel-Crafts metal halide sludge formed during the catalytic conversion of hydrocarbons in the presence of a Friedel-Crafts metal halide catalyst which comprises: continuously introducing a stream of said sludge in finely divided liquid form into an intermediate portion of a treating zone; continuously introducing a stream of steam into an intermediate portion of said treating zone at a point below the point of introduction of said sludge; controlling the amount of said steam relative to the amount of said sludge and contacting said sludge with said controlled amount of steam so as to effect only a partial hydrolysis of the metal halide contained in said sludge; continuously withdrawing unreacted steam and vaporous products of said hydrolysis reaction as an overhead stream from said treating zone; passing said overhead stream through a condensing zone; continuously returning water (condensed unreacted steam) and higher boiling hydrocarbons from said condensing zone as reflux directly to the upper portion of said treating zone at a point separate from and above the point of introduction of said sludge; and recovering substantially anhydrous hydrogen halide from the effluent from said condensing zone.

4. A continuous process for treating a Friedel-Crafts metal halide sludge formed during the catalytic conversion of hydrocarbons in the presence of a Friedel-Crafts metal halide catalyst which comprises: continuously introducing a stream of said sludge in finely divided liquid form into an upper portion of a treating zone; continuously introducing a stream of steam into said treating zone at a point below the point of introduction of said sludge; countercurrently contacting descending particles of said sludge with said steam in a first hydrolysis step and effecting only a partial hydrolysis of the metal halide contained in said sludge to produce hydrogen halide and a partially hydrolyzed sludge; continuously introducing a stream of water in finely divided form into a lower portion of said treating zone at a point below the point of introduction of said steam; intimately contacting descending particles of said partially hydrolyzed sludge with said finely divided water in a second hydrolysis step and substantially completing hydrolysis of remaining metal halide in said partially hydrolyzed sludge; continuously withdrawing unreacted steam and vaporous products of said hydrolysis reactions as an overhead stream from said treating zone; passing said overhead stream through a condensing zone; continuously returning condensed unreacted steam and higher boiling hydrocarbons from said condensing zone as reflux directly to the upper portion of said treating zone at a point separate from and above the point of introduction of said sludge; recovering substantially anhydrous hydrogen halide from the effluent from said condensing zone; and continuously withdrawing products of said hydrolysis reactions comprising a mixture of said higher boiling hydrocarbons, finely divided metal oxide, and aqueous hydrogen halide from the bottom portion of said treating zone.

5. A process according to claim 4 wherein said metal halide is aluminum chloride, said hydrogen halide is hydrogen chloride, said steam is introduced in an amount within the range of 0.05 to 0.25 pound per pound of sludge, the amount of said metal halide hydrolyzed in said first hydrolysis step is within the range of 50 to 70 percent, said water is introduced in an amount within the range of 0.25 to 1 pound per pound of sludge, and said substantially anhydrous hydrogen halide contains not more than 0.1 weight percent water.

6. In a process for the production of hydrogen halide from a Friedel-Crafts metal halide sludge, formed during an organic reaction in the presence of a Friedel-Crafts metal halide catalyst, wherein said sludge is contacted in a first section of a treating zone with a hydrolyzing agent selected from the group consisting of steam and water to produce vaporous hydrogen halide and a residue, and said residue is then contacted with water in a second section of said treating zone to produce additional vaporous hydrogen halide, the method of operation which comprises: withdrawing said vaporous hydrogen halide overhead from said treating zone; contacting at least a portion of said vaporous hydrogen halide from said treating zone with water in an absorption zone to form an acid; determining the concentration of said acid; and controlling at least one of (a) the amount of water introduced into said second section of said treating zone and (b) the amount of water introduced into said absorption zone, responsive to the concentration of said acid.

7. In a process for the production of hydrogen halide from a Friedel-Crafts metal halide sludge, formed during an organic reaction in the presence of a Friedel-Crafts metal halide catalyst, wherein said sludge is contacted in a first section of a treating zone with a hydrolyzing agent selected from the group consisting of steam and water to produce vaporous hydrogen halide and a residue, and said residue is then contacted with water in a second section of said treating zone to produce additional vaporous hydrogen halide, the method of controlling the amount of vaporous hydrogen halide produced overhead from said treating zone which comprises: withdrawing said vaporous hydrogen halide overhead from said treating zone; contacting a predetermined fixed percentage of said vaporous hydrogen halide from said treating zone with a predetermined quantity of water in an absorption zone to form an aqueous solution of said hydrogen halide; determining the concentration of said solution; and controlling the amount of water passed to said second section of said treating zone responsive to said concentration of said solution.

8. In a process for the production of hydrogen halide from a Friedel-Crafts metal halide sludge, formed during an organic reaction in the presence of a Friedel-Crafts metal halide catalyst, wherein said sludge is contacted in a first section of a treating zone with a hydrolyzing agent selected from the group consisting of steam and water to produce vaporous hydrogen halide and a residue, and said residue is then contacted with water in a second section of said treating zone to produce additional vaporous hydrogen halide, the improved method of operation which comprises: withdrawing said vaporous hydrogen halide overhead from said treating zone; recovering a predetermined fixed percentage of said withdrawn hydrogen halide as a product of the process; contacting the remainder of said withdrawn hydrogen halide with water in an absorption zone to form an aqueous solution of said hydrogen halide; determining the concentration of said solution; and controlling the amount of said contacting water introduced into said absorption zone responsive to the concentration of said solution.

9. In a process for the production of hydrogen halide from a Friedel-Crafts metal halide sludge, formed during an organic reaction in the presence of a Friedel-Crafts metal halide catalyst, wherein said sludge is contacted in a first section of a treating zone with a hydrolyzing agent selected from the group consisting of steam and water to produce vaporous hydrogen halide and a residue, and said residue is then contacted with water in a second section of said treating zone to produce additional vaporous hydrogen halide, the method of operation which comprises: withdrawing said vaporous hydrogen halide overhead from said treating zone; contacting at least a portion of said vaporous hydrogen halide from said treating zone with water in an absorption zone to form an acid; determining the boiling point of said acid; and controlling at least one of (a) the amount of water introduced into said second section of said treating zone and (b) the amount of water introduced into said absorption zone, responsive to the boiling point of said acid.

10. In a process for the production of hydrogen halide from a Friedel-Crafts metal halide sludge, formed during an organic reaction in the presence of a Friedel-Crafts metal halide catalyst, wherein said sludge is contacted in a first section of a treating zone with a hydrolyzing agent selected from the group consisting of steam and water to produce vaporous hydrogen halide and a residue, and said residue is then contacted with water in a second section of said treating zone to produce additional vaporous hydrogen halide, the method of controlling the amount of vaporous hydrogen halide produced overhead from said treating zone which comprises: withdrawing said vaporous hydrogen halide overhead from said treating zone; contacting a predetermined fixed percentage of said vaporous hydrogen halide from said treating zone with a predetermined quantity of water in an absorption zone to form an aqueous solution of said hydrogen halide; determining the boiling point of said solution; and controlling the amount of water passed to said second section of said treating zone responsive to said boiling point of said solution.

11. In a process for the production of hydrogen halide from a Friedel-Crafts metal halide sludge, formed during an organic reaction in the presence of a Friedel-Crafts metal halide catalyst, wherein said sludge is contacted in a first section of a treating zone with a hydrolyzing agent selected from the group consisting of steam and water to produce vaporous hydrogen halide and a residue, and said residue is then contacted with water in a second section of said treating zone to produce additional vaporous hydrogen halide, the improved method of operation which comprises: withdrawing said vaporous hydrogen halide overhead from said treating zone; recovering a predetermined fixed percentage of said withdrawn hydrogen halide as a product of the process; contacting the remainder of said withdrawn hydrogen halide with water in an absorption zone to form an aqueous solution of said hydrogen halide; determining the boiling point of said solution; and controlling the amount of said contacting water introduced into said absorption zone responsive to the boiling point of said solution.

12. In a process wherein a Friedel-Crafts metal halide sludge, formed during the catalytic conversion of hydrocarbons in the presence of a Friedel-Crafts metal halide catalyst, is contacted in finely divided liquid form in a first section of a treating zone with a hydrolyzing agent selected from the group consisting of finely divided water and steam to effect only a partial hydrolysis of the metal halide in said sludge and produce vaporous hydrogen halide and a finely divided, free-flowing residue, and said residue is contacted in a second section of said treating zone with water to substantially complete said hydrolysis and produce additional vaporous hydrogen halide, the method of controlling the amount of vaporous hydrogen halide produced overhead from said treating zone which comprises: controlling the amount of said hydrolyzing agent introduced into said first section of said treating zone relative to the amount of sludge introduced so as to obtain said partial hydrolysis of the metal halide in said sludge; passing at least a portion of said vaporous hydrogen halide to an absorption zone, said portion being a predetermined fixed percentage of said produced vaporous hydrogen halide; in said absorption zone, contacting said vaporous hydrogen halide with a predetermined amount of water to form an aqueous solution of said hydrogen halide; determining the boiling point of said solution; and controlling the amount of water introduced into said second section of said treating zone responsive to the boiling point of said solution.

13. In a process for the production of hydrogen halide from a Friedel-Crafts metal halide sludge, formed during an organic reaction in the presence of a Friedel-Crafts metal halide catalyst, wherein said sludge is contacted in finely divided liquid form in a first section of a treating zone with a hydrolyzing agent selected from the group consisting of finely divided water and steam in an amount sufficient to effect only a partial hydrolysis of the metal halide in said sludge to produce vaporous hydrogen halide and a finely divided, free-flowing residue, and said residue is then contacted with water in a second section of said treating zone in an amount sufficient to substantially complete said hydrolysis and thus produce additional vaporous hydrogen chloride, the improved method of operation which comprises: withdrawing a stream comprising said produced vaporous hydrogen chloride overhead from said treating zone; recovering a predetermined fixed percentage of said withdrawn hydrogen halide as a product of the process; passing the remainder of said withdrawn stream of hydrogen halide to an absorption zone; in said absorption zone, contacting said remainder of said stream with water to form an aqueous solution of hydrogen halide; determining the boiling point of said solution; and controlling the amount of contacting water introduced into said absorption zone responsive to said boiling point.

14. A process according to claim 9 wherein said portion of hydrogen halide contacted with water in said absorption zone is a sufficient amount, relative to the amount of contacting water, to produce an acid having a concentration of hydrogen halide, in weight percent, within the ranges of 0.1 to 19 inclusive, and 23 to 38 inclusive.

15. The method of claim 10 wherein said metal halide is aluminum chloride, said hydrogen halide is hydrogen chloride, and said predetermined quantity of water is an amount sufficient to form an aqueous solution of hydrogen chloride having a concentration of hydrogen chloride, in weight percent, within the ranges of 0.1 to 19 inclusive, and 23 to 38 inclusive.

16. The method of claim 11 wherein said metal halide is aluminum chloride, said hydrogen halide is hydrogen chloride, and the amount of said contacting water introduced into said absorption zone is an amount sufficient to form an aqueous solution of hydrogen chloride having a concentration of hydrogen chloride, in weight percent, within the ranges of 0.1 to 19 inclusive, and 23 to 38 inclusive.

17. The method of claim 12 wherein said metal halide is aluminum chloride, said hydrogen halide is hydrogen chloride, and said predetermined quantity of water is an amount sufficient to form an aqueous solution of hydrogen chloride having a concentration of hydrogen chloride, in weight percent, within the ranges of 0.1 to 19 inclusive, and 23 to 38 inclusive.

18. The method of claim 13 wherein said metal halide is aluminum chloride, said hydrogen halide is hydrogen chloride, and the amount of said contacting water introduced into said absorption zone is an amount sufficient to form an aqueous solution of hydrogen chloride having a concentration of hydrogen chloride, in weight percent, within the ranges of 0.1 to 19 inclusive, and 23 to 38 inclusive.

19. A continuous process for treating a Friedel-Crafts metal halide sludge formed during the catalytic conversion of hydrocarbons in the presence of a Friedel-Crafts metal halide catalyst which comprises: continuously introducing a stream of said sludge in finely divided liquid form into an upper portion of a treating zone; continuously introducing a stream of a hydrolyzing agent selected from the group consisting of finely divided water and steam into said treating zone at a point below the point of introduction of said sludge; countercurrently contacting descending particles of said sludge with said hydrolyzing agent in a first hydrolysis step and effecting only a partial hydrolysis of the metal halide contained in said sludge to produce hydrogen halide and a partially hydrolyzed sludge; continuously introducing a stream of water in finely divided form into a lower portion of said treating zone at a point below the point of introduction of said hydrolyzing agent; intimately contacting descending particles of said partially hydrolyzed sludge with said finely divided water in a second hydrolysis step and substantially completing hydrolysis of remaining metal halide in said partially hydrolyzed sludge; continuously withdrawing unreacted hydrolyzing agent and vaporous products of said hydrolysis reactions as an overhead stream from said treating zone; passing said overhead stream through a condensing zone; continuously returning condensed unreacted hydrolyzing agent and higher boiling hydrocarbons from said condensing zone as reflux directly to the upper portion of said treating zone at a point separate from and above the point of introduction of said sludge; recovering substantially anhydrous hydrogen halide from the effluent from said condensing zone; and continuously withdrawing products of said hydrolysis reactions comprising a mixture of said higher boiling hydrocarbons, finely divided metal oxide, and aqueous hydrogen halide from the bottom portion of said treating zone.

20. A continuous process for treating a Friedel-Crafts metal halide sludge formed during the catalytic conversion of hydrocarbons in the presence of a Friedel-Crafts metal halide catalyst, which process comprises: contacting said sludge in finely divided liquid form with a hydrolyzing agent selected from the group consisting of finely divided water and steam in the upper portion of a treating zone and effecting a partial hydrolysis of the metal halide contained in said sludge to form hydrogen halide and particles of partially hydrolyzed sludge; contacting said particles of partially hydrolyzed sludge with water in a lower portion of said treating zone and substantially completing hydrolysis of remaining metal halide in said partially hydrolyzed sludge; withdrawing unreacted hydrolyzing agent and vaporous products of said hydrolysis reactions as an overhead effluent from said treating zone; passing said effluent to a condensing zone; returning condensed hydrolyzing agent from said condensing zone as reflux directly to the upper portion of said treating zone at a point separate from and above the point of introduction of said sludge; and recovering substantially anhydrous hydrogen halide from said effluent after its passage through said condensing zone.

21. A continuous process of treating a Friedel-Crafts metal halide sludge formed during the catalytic conversion of hydrocarbons in the presence of a Friedel-Crafts metal halide catalyst, which process comprises: continuously introducing a stream of said sludge in finely divided liquid form into an intermediate portion of a treating zone; continuously introducing a stream of steam into an intermediate portion of said treating zone at a point separate from and below the point of introduction of said sludge; controlling the amount of said steam relative to the amount of said sludge and contacting said sludge with said controlled amount of steam so as to effect only a partial hydrolysis of the metal halide contained in said sludge to produce hydrogen halide and particles of partially hydrolyzed sludge; continuously introducing a stream of water in finely divided form into a lower portion of said treating zone at a point separate from and below the point of introduction of said steam; intimately contacting descending particles of said partially hydrolyzed sludge with said finely divided water in a second hydrolysis step and substantially completing hydrolysis of remaining metal halide in said partially hydrolyzed sludge; continuously withdrawing unreacted steam and vaporous products of said hydrolysis reactions as an overhead stream from said treating zone; passing said overhead stream through a condensing zone; continuously returning water (condensed unreacted steam) and higher boiling hydrocarbons from said condensing zone as reflux directly to the upper portion of said treating zone at a point separate from and above the point of introduction of said sludge; and recovering substantially anhydrous hydrogen halide from the effluent from said condensing zone.

22. A continuous process for treating a Friedel-Crafts metal halide sludge formed during the catalytic conversion of hydrocarbons in the presence of a Friedel-Crafts metal halide catalyst, which process comprises: continuously introducing a stream of said sludge in finely divided liquid form into an upper portion of a treating zone; continuously introducing a mixed stream of steam and water into said treating zone at a point separate from and below the point of introduction of said sludge; countercurrently contacting descending particles of said sludge with upwardly rising steam in a first hydrolysis step and effecting only a partial hydrolysis of the metal halide contained in said sludge to produce hydrogen halide and particles of partially hydrolyzed sludge; intimately contacting descending particles of said partially hydrolyzed sludge with said water in a second hydrolysis step in a lower portion of said treating zone and substantially completing hydrolysis of remaining metal halide in said particles of partially hydrolyzed sludge; continuously withdrawing unreacted steam and vaporous products of said hydrolysis reactions as an overhead stream from said treating zone; passing said overhead stream through a condensing zone; continuously returning condensed unreacted steam and higher boiling hydrocarbons from said condensing zone as reflux directly to the upper portion of said treating zone at a point separate from and above the point of introduction of said sludge; and recovering substantially anhydrous hydrogen halide from the effluent from said condensing zone.

23. In a continuous process for the production of hydrogen halide from a Friedel-Crafts metal halide sludge, formed during an organic reaction in the presence of a Friedel-Crafts metal halide catalyst, wherein said sludge is contacted in a first section of a treating zone with a hydrolyzing agent selected from the group consisting of steam and finely divided water to produce vaporous hydrogen halide and particles of partially hydrolyzed sludge, said particles of partially hydrolyzed sludge are then contacted with water in a second section of said treating zone to substantially complete said hydrolysis and produce additional vaporous hydrogen halide, and unreacted steam and vaporous products of said hydrolysis reactions are withdrawn as an overhead stream from said treating zone, the improvement which comprises: passing said overhead stream through a condensing zone; continuously returning condensed unreacted hydrolyzing agent and higher boiling hydrocarbons from said condensing zone as reflux directly to the upper portion of said treating zone at a point separate from and above the point of introduction of said sludge; and recovering substantially anhydrous hydrogen halide from the effluent from said condensing zone.

References Cited in the file of this patent
UNITED STATES PATENTS
1,865,797    Shiffler _____ July 5, 1932